US010661754B2

(12) United States Patent
Gerdes et al.

(10) Patent No.: US 10,661,754 B2
(45) Date of Patent: May 26, 2020

(54) INSIDE DOOR HANDLE SYSTEM FOR A DOOR OF A VEHICLE

(71) Applicant: Huf Hülsbeck & Fürst GmbH & Co. KG, Velbert (DE)

(72) Inventors: Bernd Gerdes, Essen (DE); Coen Dieker, Dinxperlo (NL)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 15/327,147

(22) PCT Filed: Jul. 20, 2015

(86) PCT No.: PCT/EP2015/066587
§ 371 (c)(1),
(2) Date: Jan. 18, 2017

(87) PCT Pub. No.: WO2016/009091
PCT Pub. Date: Jan. 21, 2016

(65) Prior Publication Data
US 2017/0158170 A1  Jun. 8, 2017

(30) Foreign Application Priority Data
Jul. 18, 2014  (DE) .................. 10 2014 110 092

(51) Int. Cl.
*G05B 19/00* (2006.01)
*B60R 25/24* (2013.01)
(Continued)

(52) U.S. Cl.
CPC ........ *B60R 25/245* (2013.01); *B60R 25/2036* (2013.01); *E05B 17/10* (2013.01);
(Continued)

(58) Field of Classification Search
None
See application file for complete search history.

(56) References Cited

U.S. PATENT DOCUMENTS 5,929,769 A * 7/1999 Garnault ............. B60R 25/2009
340/12.51
5,995,064 A * 11/1999 Yanagisawa ........... H01Q 1/242
343/702
(Continued)

FOREIGN PATENT DOCUMENTS

CN       101023232    8/2007
DE        20210610   10/2002
(Continued)

OTHER PUBLICATIONS

Internationaler Recherchenbericht und Schriftlicher Bescheid [International Search Report and the Written Opinion] dated Nov. 18, 2015 From the Internationale Recherchenberhörde [International Searching Authority] Re. Application No. PCT/EP2015/066587. (10 Pages).
(Continued)

Primary Examiner — K. Wong

(57) ABSTRACT

The invention relates to an inside door handle system for a door of a vehicle, wherein the door is transferable into a locking state and into an unlocked state by a closing system, comprising an actuation element for the actuation of the closing system and at least one support connectable with the door at which the actuation element is assembled, and further comprising at least a sensor element which with an approaching of an object in its recognition area transmits a recognition signal, wherein a release mode for the closing system is intended with which the closing system is in the unlocked state with which the actuation of the actuation element successively effects an opening function of the door wherein a control unit can be brought into data communi-
(Continued)

cation with the closing system and the sensor element, wherein in dependence on an existing recognition signal and of a vehicle related release signal the control unit transfers the closing system into the release mode.

23 Claims, 9 Drawing Sheets

(51) Int. Cl.
<table>
<tr><td>E05B 85/12</td><td>(2014.01)</td></tr>
<tr><td>E05B 17/10</td><td>(2006.01)</td></tr>
<tr><td>E05B 81/76</td><td>(2014.01)</td></tr>
<tr><td>E05B 81/78</td><td>(2014.01)</td></tr>
<tr><td>B60R 25/20</td><td>(2013.01)</td></tr>
<tr><td>G05B 23/00</td><td>(2006.01)</td></tr>
</table>

(52) U.S. Cl.
CPC .............. *E05B 81/77* (2013.01); *E05B 81/78* (2013.01); *E05B 85/12* (2013.01); *G05B 19/00* (2013.01); *G05B 23/00* (2013.01)

(56) References Cited

U.S. PATENT DOCUMENTS

| | | | | |
|---|---|---|---|---|
| 6,664,899 B1* | 12/2003 | Tsuchihashi | .......... | B60R 25/245 180/287 |
| 6,906,612 B2* | 6/2005 | Ghabra | .................. | B60R 25/24 340/5.61 |
| 6,933,831 B2* | 8/2005 | Ieda | ...................... | B60R 25/246 340/426.1 |
| 7,180,281 B2* | 2/2007 | Inuzuka | ................. | E05B 81/76 324/690 |
| 7,598,753 B2* | 10/2009 | Ieda | ...................... | B60R 25/246 324/658 |
| 7,679,571 B2* | 3/2010 | Inaba | .................... | B60R 25/246 343/713 |
| 8,044,768 B2* | 10/2011 | Nakasato | ............ | B60R 25/2027 340/426.16 |
| 8,098,130 B2* | 1/2012 | Baruco | ................. | B60R 25/245 340/426.36 |
| 8,589,032 B2* | 11/2013 | Witte | ...................... | E05B 77/54 70/264 |
| 9,145,717 B2* | 9/2015 | Schuessler | .............. | E05B 81/78 |
| 9,580,046 B2* | 2/2017 | Luu | ......................... | E05F 15/73 |
| 9,646,436 B1* | 5/2017 | Campbell | ........... | G07C 9/00111 |
| 2003/0216817 A1 | 11/2003 | Pudney | | |
| 2005/0219043 A1 | 10/2005 | Pollmann et al. | | |
| 2015/0258962 A1* | 9/2015 | Khanu | ................ | B60R 25/2054 701/49 |

FOREIGN PATENT DOCUMENTS

| | | |
|---|---|---|
| DE | 102009005525 | 1/2010 |
| DE | 202010006996 | 8/2010 |
| JP | 2006-118349 | 5/2006 |
| WO | WO 2016/009091 | 1/2016 |

OTHER PUBLICATIONS

Notification of Office Action and Search Report dated Jul. 3, 2018 From the State Intellectual Property Office of the People's Republic of China Re. Application No. 201580038755.3 and Its Translation Into English. (12 Pages).

* cited by examiner

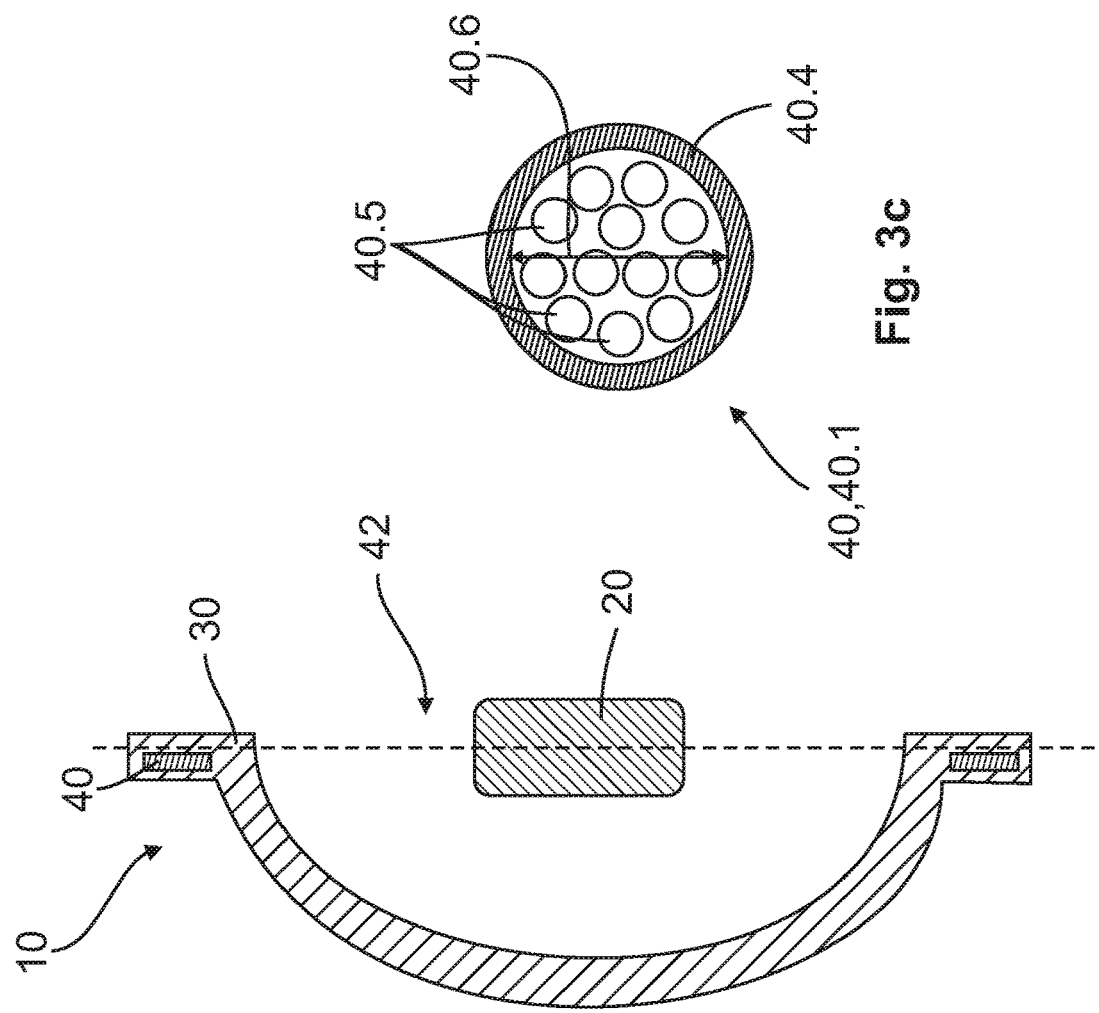
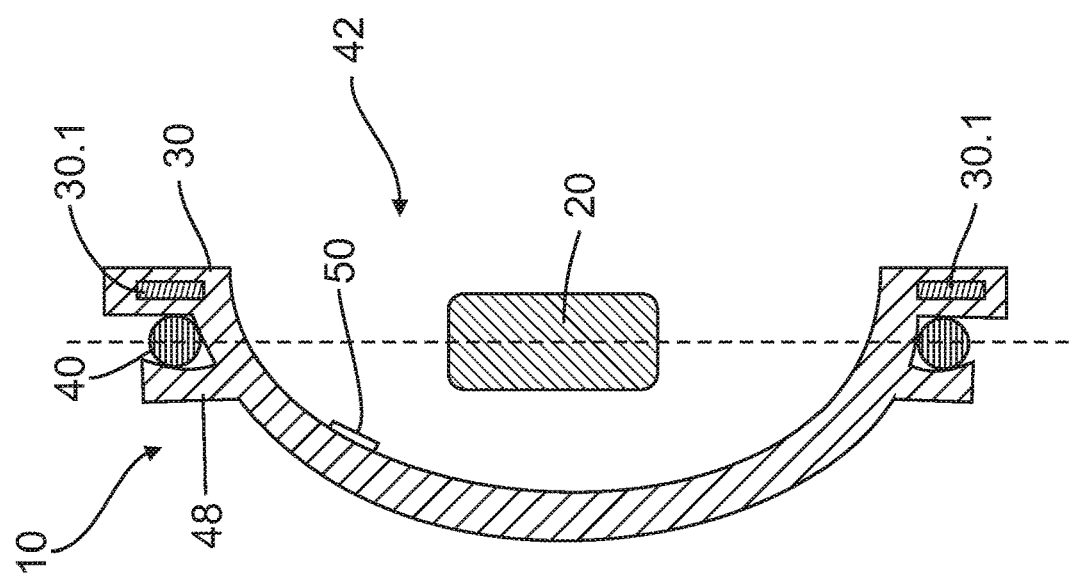

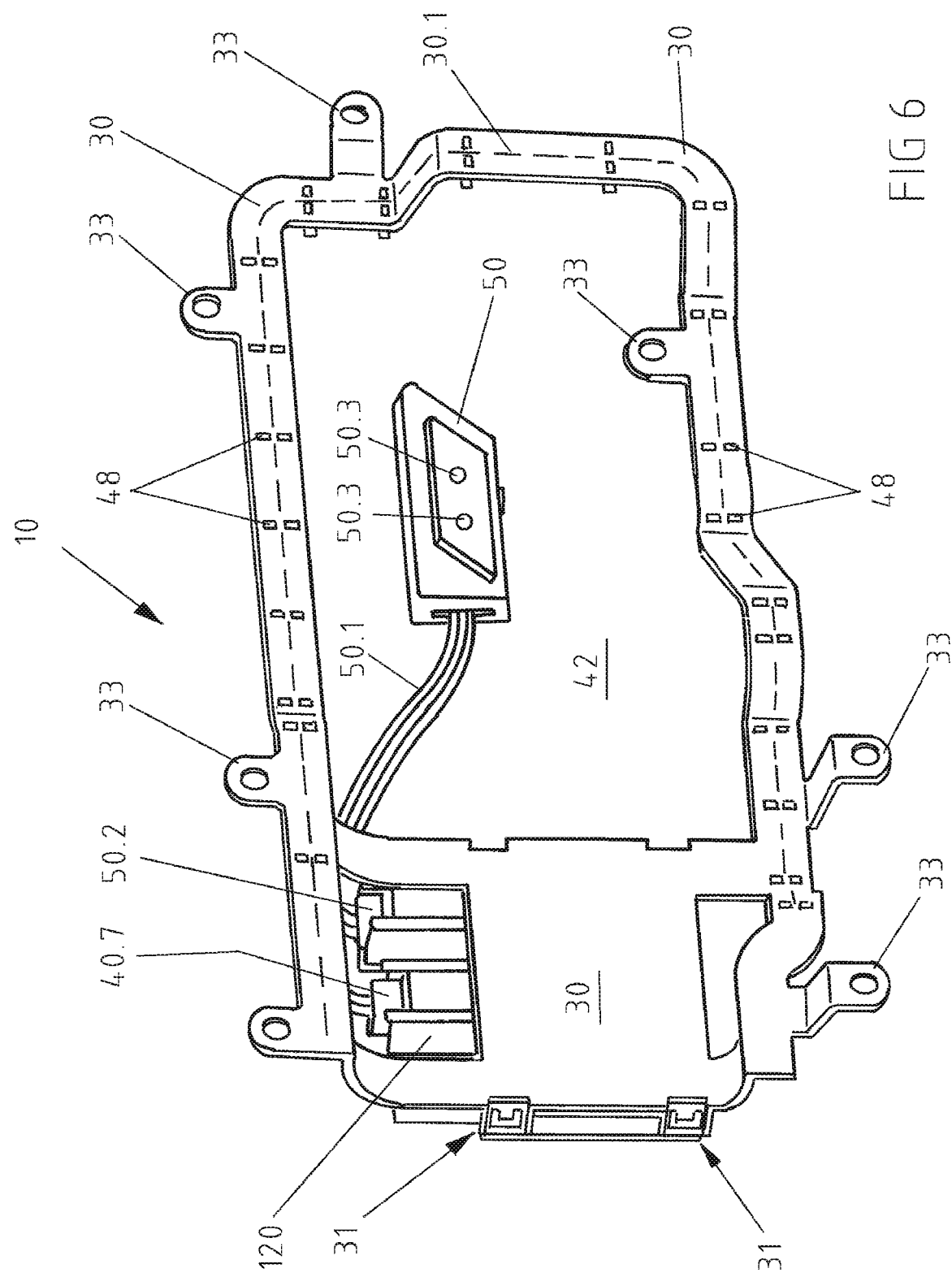

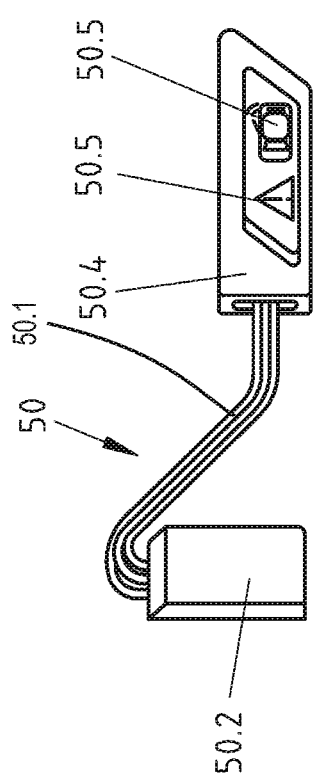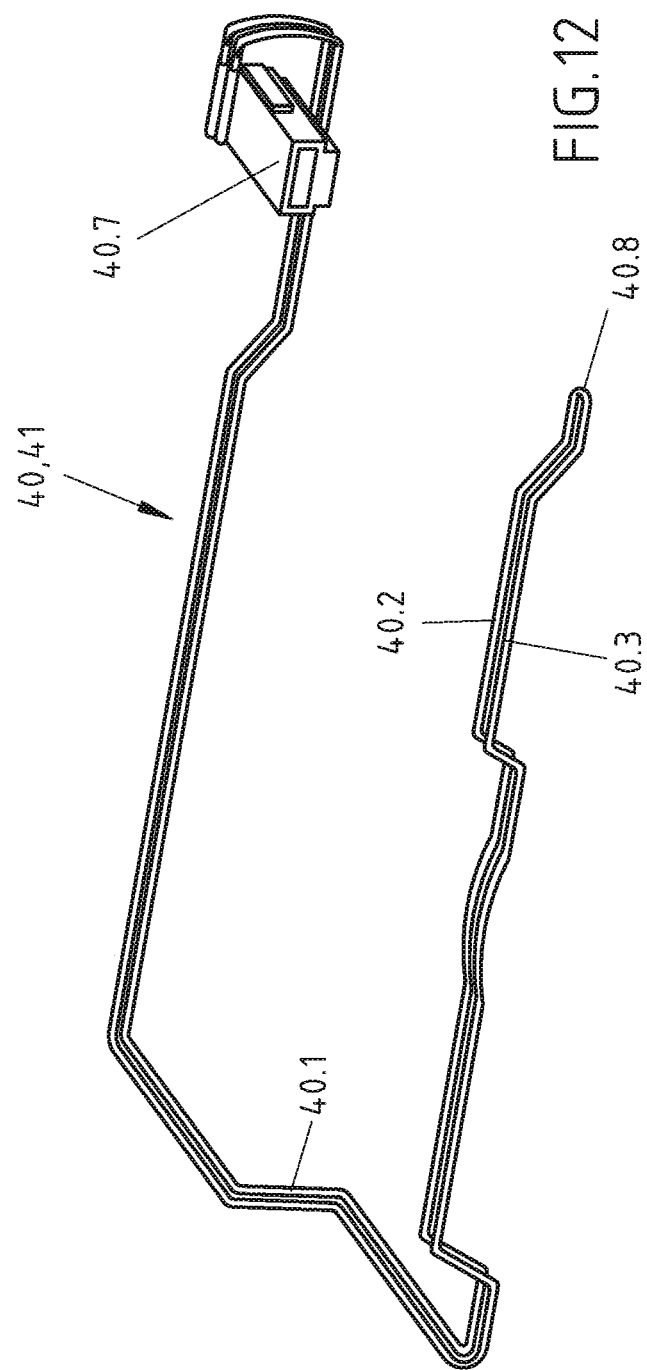

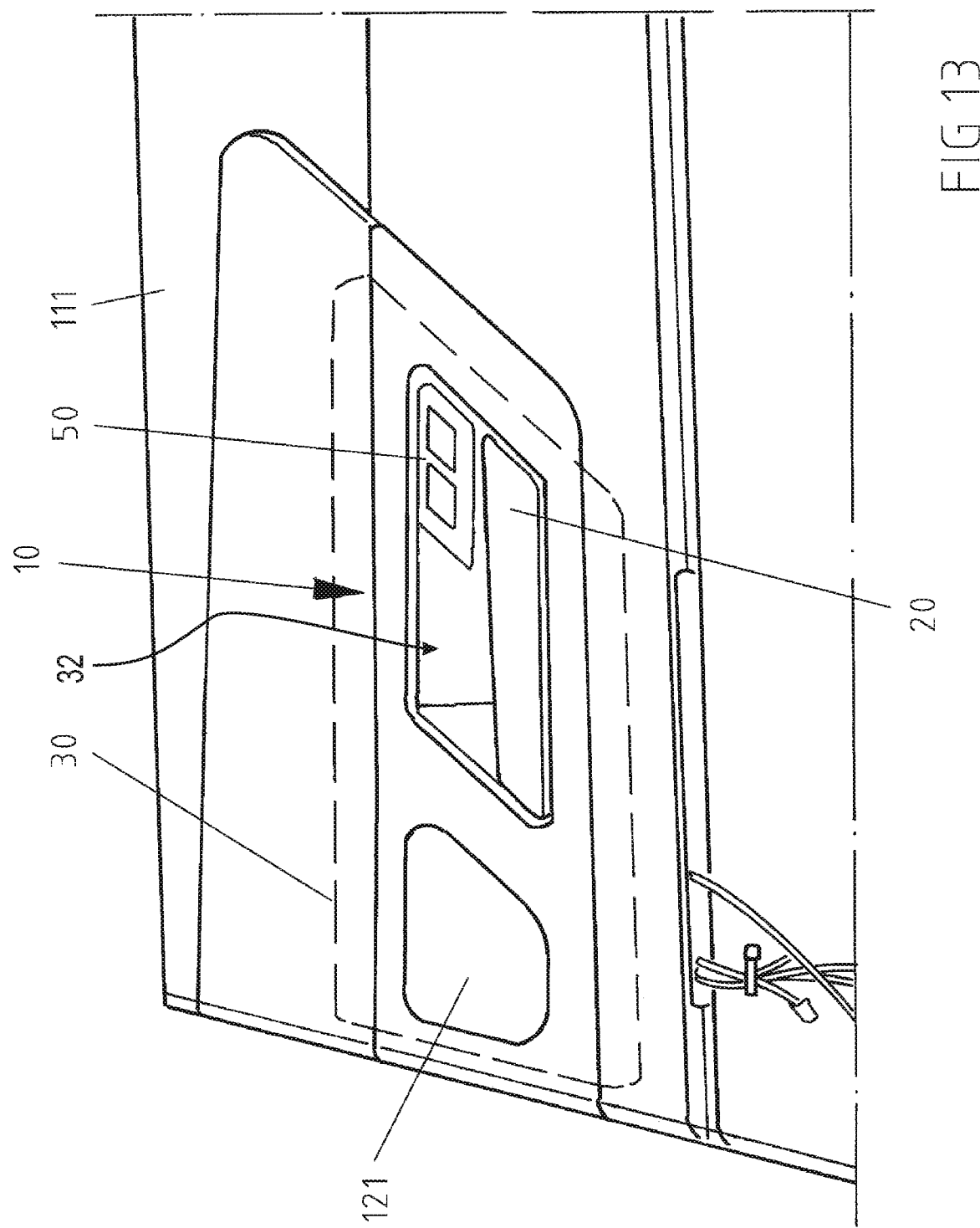

500

INSIDE DOOR HANDLE SYSTEM FOR A DOOR OF A VEHICLE

RELATED APPLICATIONS

This application is a National Phase of PCT Patent Application No. PCT/EP2015/066587 having International filing date of Jul. 20, 2015, which claims the benefit of priority of German Patent Application No. 10 2014 110 092.1 filed on Jul. 18, 2014. The contents of the above applications are all incorporated by reference as if fully set forth herein in their entirety.

DESCRIPTION

The present invention relates to an inside door handle system for a door of a vehicle according to the preamble of claim 1 and an inner door panel with an inside door handle system according to the preamble of claim 21 and a vehicle, particularly a motor vehicle according to the preamble of claim 22, with at least one such inside door handle system.

FIELD AND BACKGROUND OF THE INVENTION

It is known that vehicles comprise inside door handle systems in order to open a door from the inside. Normally, a door of a motor vehicle is configured with a moveable lever as an actuation element, wherein by a deviation of these actuation elements in form of a lever a mechanic movement of a closing system can be performed. The closing system can be moved back and forth between a locking state and an opening state by the actuation element. With other words, by the actuation element, for example with the help of a Bowden cable, a mechanic latch can be released such that from the locking state the closing system can be transferred into the opening state and subsequently the door can be opened from the inside by pressure.

It is a disadvantage with known solutions that for difficult application situations, particularly with the risk concerning an undesired opening of the door, a remaining risk remains. Is for example a door an inversely opening door compared to the driving direction it has to be avoided that the door opens in an undesired manner during driving with the highest safety. Hereby, until now, only additional protection possibilities can be used which particularly need a complete locking of the vehicle. This leads to an additional effort in order to achieve the necessary increased safety. Therewith, additional costs for the whole vehicle apply.

Further, the opening of the latch back of a motor vehicle represents an additional risk, since the rear passengers do not have an exterior mirror in order to control if passengers or bikers are in the vicinity. Thus, an unexpected opening of the rear doors contains an increased risk of accidents for passing passengers or vehicles which drive by, particularly bikers, which results from an unobserved opening of the rear doors.

SUMMARY OF THE INVENTION

It is an object of the present invention to at least partially avoid the previously described disadvantages. Particularly, it is an object of the present invention to improve the safety by using an inside door handle system of a vehicle in a cost efficient and simple manner.

Said object is solved by an inside door handle system with the features of claim 1 and an inner door panel with the features of claim 21 and a vehicle with the features of claim 22. Further features and details of the invention result from the dependent claims, the description and the drawings. Thereby, features and details of the invention which are described in connection with the inside door handle system according to the invention or the inner door panel according to the invention or the vehicle according to the invention, naturally also apply in connection with the respective other aspects of the invention such that according to the disclosure of the single aspects of the invention it can always be reciprocally related to.

The inside door handle system according to the invention for a door of a motor vehicle is thereby configured for a door which comprises a closing system which can be transferred into a locked state and an unlocked state. Herefore, the inside door handle system according to the invention comprises an actuation element for the actuation of a closing system and at least a support connectable with a door and/or inner door panel at which the actuation element is assembled. Further, at least one sensor element is intended which by an approaching (in the inside of the motor vehicle) of an object (approaching occurs of the inside of the vehicle/passenger compartment) in a recognition area and generates a recognition signal. Thereby, a release mode is intended for the closing system by which the closing system is in an unlocked state with which the actuation of the actuation element successfully effects an opening function of the door. Further, a control unit can be in data communication with the closing system and the sensor element such that dependent of an existing recognition signal and a vehicle related release signal the control unit of the closing system is transferred or can be transferred into the release mode. An inside door handle system according to the invention is characterized in that the actuation element is assembled within the recognition area of the sensor element.

For a better understanding it should be mentioned that the sensor element of the inside door handle system according to the invention is normally at least a capacitive sensor element, particularly in form of an already described wire in order to be able to measure an approaching of an object in the recognition area in a capacitive manner. Therewith, the corresponding sensor element is configured as a capacitive proximity sensor.

An inside door handle system according to the invention for a door of a motor vehicle accordingly relates to known inside door handle systems. The closing system is however further developed in an additional functionality. Thus, the closing system, except a simple mechanic locking function and a mechanic opening function which also exist with known doors between the closing and opening of the door, can now occupy an unlocked state and a locking state. Hereby, mechanically it is about a comparable status situation like with locking and unlocking of the whole vehicle. However, the closing system is specific for this door such that here for this door and therewith specific for a single inside door handle system a single and therewith separately turnable or switchable locking state or unlocked state can be generated. The closing system comprises at least a mechanic or electro mechanic lock in order to mechanically close the door.

The actuation element according to the invention with an inside door handle system is used for the actuation of the closing system, particularly in relation to a switching between the locking function and the locking state and the opening function or the unlocked state. It has to be understood that the actuation element enables with the actuation in a known manner an opening of the door by mechanic cancellation of the locking function.

According to the invention additionally a sensor element is existent which provides the approaching of an object particularly by a capacitive measurement in a recognition area which is particularly arranged at the inside of the motor vehicle. This recognition is generated as a recognition signal such that subsequently by a data communication this information can be transferred to a control unit. Such a control unit can thereby be part of the vehicle communication system. Naturally, it can be an advantage when an inside door handle system according to the invention itself comprises the corresponding control unit and this is in data communication with the closing system and the sensor element.

Due to the fact that now according to the core idea of the present invention the actuation element is assembled inside the recognition area of the sensor element an increased security can be ensured. This increased security is achieved without limiting the comfort concerning the usability of the actuation element. Thus, the sensor element leads to the fact that already previous to the actual performance of the actuation movement, the actuation element possesses an information about the recognition signal that with a high probability immediately an actuation is desired by a passenger of the motor vehicle. With other words, the recognition signal serves for the fact to forewarn the control unit that with a high probability immediately an opening movement of the actuation element is performed.

By this forewarning it is possible to perform a corresponding preparation of the closing system before an actual performance of the actuation movement of the actuation element in a timely manner by a switching in the release mode, thus a switching between the locking state and the unlocked state.

Besides the preparation and the corresponding increase in safety in the control unit the release mode can naturally be dependent from two or more additional incoming signals. This ensures that the security according to the invention can be further increased. Thus, particularly a vehicle related release signal is requested or is expected as a requirement previous to the take up of the release mode for the closing system. Such release signal can for example be an already existing vehicle signal. Thus, it is for example possible that within the motor vehicle a current speed is inquired. If the inside door handle system is for example a system for an inversely opening door, thus the vehicle related release signal can contain a maximum forward speed. Further, it can be an advantage when the vehicle related release signal provides a mandatory standing vehicle with the speed of 0 km/h. Naturally, alternatively or additionally other vehicle related release signals are possible. For example, a particularly capacitive determinable seat occupancy according to the corresponding seats within the motor vehicle can act in correlation to the inside door handle system. Further, a belt information, thus the information about the buckle up of a passenger, can be used as a vehicle related release signal. Further, the vehicle related release signal can result from a radar signal or a proximity signal of a capacitive sensor which monitors the surroundings outside the vehicle in the area of the corresponding door (of the inside door handle system) and therewith a reliable warning signal is generated in case a passenger, a biker or a closely proceeding vehicle is detected in the opening area of the respective door. Only when the corresponding release signal, for example "1", exists it can be transferred into the release mode by the control unit. Therefore, it is possible that all additional incoming signals comprise at least "1" in order to achieve the release mode.

Now it is possible according to the invention to improve the safety of the inside door handle system against an undesired and risky opening of the door. At the same time this increase in safety however is related to the known and for the vehicle user usual comfort of the opening function of the inside door handle system. This is according to the invention achieved by the fact that a sensor element recognizes an approaching of an object essentially from all sides of the activation element. By the fact that the sensor element with the recognition area principally completely encloses the actuation element or the actuation element preferably is completely within the recognition area it is ensured that with the corresponding warning time preferably with a 100% safety the movement of the object and therewith an increased probability of the desire of actuation is recognized.

It has to be pointed out that the recognition area of a sensor element according to the invention can naturally comprise different geometric forms, particularly the recognition area can be configured two dimensional and/or three dimensional in form of a recognition volume.

Thereby, it is possible that the support comprises a corresponding support recess in which a user can reach in order to reach a moveable actuating element. Naturally, it is possible that like with a light barrier the corresponding object grasps or proceeds through the recognition area of the sensor element when the actuation element is arranged at least partially behind this recognition area. In such a case naturally also the volume behind this light barrier functionality is a part of the recognition area according to the invention, since an assembly of an object in this area naturally leads to a trigger of the provided recognition signal.

It has to be pointed out that an actuation element within the sense of the present invention not unavoidably has to perform a mechanic movement. Naturally, an electric opening for example by a contact functionality by an actuation element is providable. Also a combination of different actuation functions is possible within the scope of the present invention. The forwarding and the performance within the closing system can thereby likewise be provided mechanically, only electronically and by a combination of the same.

It can be an advantage when with the inside door handle system according to the invention the actuation element is arranged within a projection area of the sensor element, particularly in the centre, wherein particularly the projection area is configured by an essentially perpendicular projection from the direction of the actuation element to the sensor element. The projection area can thereby particularly comprise a plane or mainly a plane. This leads to the fact that a particularly small and therewith light and cost efficient adjustable or generatable projection area provides a small geometric extension of the recognition area. Therewith, a simple, small and also cost efficient configuration of a corresponding sensor element can be provided. The reduction of the recognition area to a corresponding projection area further leads to a significant reduction of undesired false triggering. Thus, it is ensured that a particularly direct relation between the actual place of the actuation element and the recognition area results. Thereby, the place of a moveable actuation element naturally relates to the position of the actuation element previous to the performance of the actuation part for this component.

It is likewise an advantage when with the inside door handle system according to the invention the sensor element is arranged at the support and/or at least partially embedded in the support. This leads to a further integration of the sensor element with an inside door handle system according to the invention. Therewith, the complexity, the necessary component extensions and the corresponding weight can be further reduced. An integration in form of an arrangement at the support further leads to the fact that no separate retaining device for defining the positions of the sensor element is necessary. An embedding at or in the support is particularly to be understood as an embedding as a material of the support. Naturally, it is possible that the support comprises the sensor element during its production in material unit in an integral manner. Thereby, for example with the help of the injection moulding method, the sensor element can be injected. The sensor element can thereby be configured from the same or a different material compared to the material of the support. Further, a subsequent embedding, particularly on the rear side of the support element, is possible within the sense of the present invention. This leads beneath the mechanic advantages to an improvement concerning the protection of the sensor element such that a mechanic influence which could lead to a damage or even defect of the sensor function and therewith the recognition functionality can be avoided with a higher probability.

It is a further advantage when with the inside door handle system according to the invention the sensor element comprises a conducting path, particularly in form of a wire or film, which circumferentially, particularly about a support recess, is assembled at the support. This is thereby a particularly simple and cost efficient configuration of the sensor element. Particularly in this manner, for example a capacitive recognition for the sensor function can be provided. In case a wire or a film is used, an attachment for example by gluing or by applying in form of a conducting layer, for example in form of a chrome layer, can occur at the support from the rear side. Further, a clipping or a separate fastening element is possible within the scope of the present invention. Naturally, also the whole support or the corresponding support recess can be equipped with a sensor element particularly with a flat configuration. Therewith, a further increase in safety is possible by a complete monitoring with the help of a broader recognition area within the sense of the present invention. Further, basically an upgrade possibility is given since for example a subsequent alteration of the support or with a subsequent assembly of the sensor element the advantages according to the invention can be achieved.

It is further an advantage when with the inside door handle system according to the invention the sensor element is arranged as an electric conducting coating particularly assembled at the rear side of the support. An electric conductible coating can thereby be glued or be introduced into the coating method in different ways. Thus, for example by a simple and cost efficient production the sensor element can be produced. An electric conducting coating can for example be provided in galvanic manner or by evaporation.

It is a further advantage when with the inside door handle system according to the invention the sensor element is assembled above at least one fastening element at the support and/or the sensor system is at least partially embedded within the support. A fastening element further serves for a mechanic defined correlation between the sensor element and the support. With other words, the fastening element serves for a force fitting arrangement and positioning of the sensor element. Thereby, the fastening element defines particularly the position in a definite manner such that the fastening element with the help of the positioning aids ensures a corresponding exact positioning and adjustment of the recognition area provided by the sensor element. Likewise, here the fastening elements can be provided for an external arrangement at the support and for a corresponding embedding. The attachment and therewith the assembly can be significantly simplified and improved by the use of a fastening element. At the same time risks concerning a defective mounting can be excluded with a high probability.

In order to be able to arrange the sensor element at the support in a particularly simple manner at least one or multiple fastening elements can be configured as clip elements. Hereby, the sensor element only has to be pushed into the clip elements in order to be form and/or force fittingly fixed at the support. The fastening elements can in this case be configured as clip elements and be materially bound to the support and can be produced as a plastic injection mould component. In order to possibly simplify a mechanic assembly of the support it is possible that a central clip element is configured particularly T-like and serves for fixing the wire of the sensor element at both sides (particularly two sections). Thereby, the T-like clip element can be sufficient in order to mechanically fix both sections of the wire. Additionally, beneath the central clip element two further mainly L-like clip elements can be intended which mechanically interact with the central clip elements in order to fix the wire of the central clip elements on the left and right side. Ideally, the single clip elements are configured flexible in order to at least form fittingly keep the wire at the support. For this purpose it is useful that the clip elements have a lead-in entry or lead-in curve wherein the wire has to be pressed to the clip element in order to achieve the fixation at the support. Therewith, a particularly simple assembly of the sensor element at the support is ensured.

It is likewise an advantage when with the inside door handle system according to the invention the at least one fastening element is configured hook-like and embraces the sensor element at least area-wise. As hook-like configuration is to be understood that a partly grasping of the sensor element is configured by the fastening element. This partial embracement leads particularly to a clamping functionality which by a corresponding clamping inhibition ensures an exact positioning and therewith a fixation, a fastening or securing of the sensor element in a desired defined position. Here, a further advantage concerning the complexity and cost reduction of the mounting is achieved.

It is likewise an advantage when with the inside door handle system according to the invention at least one signal element is intended in order to at least partially signal a mode of the closing system, thereby particularly the closing system, the control unit and/or the corresponding data communication management are part of the inside door handle system. A signalling element can thereby particularly comprise a sensoric output unit, which is for example configured as an optical output unit or an acoustic output unit. An optic output unit can for example be a light unit which provides a light signal as signal. Likewise a speaker as an acoustic output unit can be part of the signalling element. Thus, for example with an approaching of an object at the recognition area or an entering of the same in the recognition area the actual mode of the closing system can be displayed. If, for example, a vehicle is still driving, no release mode for the closing system applies. Thus, for example by displaying a warning colour, particularly a red lightening, the user of the inside door handle system can be pointed to this state. Also the generation of a warning tone in an acoustic manner can additionally or alternatively be provided as the safety advantage by the signalling element.

It is further an advantage when with the inside door handle system according to the invention the support comprises at least one transparent area wherein emitted light from the signalling element in form of an illumination element emits towards the front side of the support and emits from there with a light discharge. With other words, the support comprises a signalling window with the help of a transparent area which serves for the light discharge of a corresponding light signal. Particularly, thereby a colour change of the corresponding modus alteration can be represented. Thus with the release mode a green light and with the locked release mode a red light can transfer the corresponding information to the user. Naturally, in a similar manner a sound permeable area for an acoustic configuration of the signalling element can be provided for the same function. The different signalling colours with the light configuration of a signalling element can thereby be generated by a corresponding light conductor, light filter or even by different light sources.

A further advantage is achievable when with the inside door handle system according to the invention a further sensor element recognizes at least a contact of the actuation element and generates a contact signal. Thereby, an actuation of the closing system can occur in case at the same time the vehicle related release signal is available at the control unit. Hereby, an actuation element is involved which provides a contact function or a touch function. Thereby, particularly an electronic or an electro mechanic closing system or lock can be used which is able to perform the opening function namely the movement corresponding to mechanic latch parts from a closing situation into an opening situation in an electromotive manner. Naturally, this can be combined with a simple mechanic lock within the sense of the present invention for an inside door handle system. With other words, this further sensor element serves so to say as an additional recognition step for a further increase and for an improvement of the comfort with an inside door handle system according to the invention.

It is further an advantage when with an inside door handle system according to the invention the actuation element is moveable using a bearing assembled at the support, and the movement of the actuation element serves for the actuation in order to open the door. Thereby, this is mainly a basic mechanic functionality of the actuation element. The bearing is thereby particularly configured as a rotary bearing in order to provide a rotational movement of the actuation element. The corresponding coupling unit is preferably intended in order to provide a movement of the actuation element using a Bowden cable or in another mechanic manner. Naturally, this embodiment can be combined with an electro mechanic solution like previously described.

A further subject matter of the present invention is a vehicle, particularly a motor vehicle with at least one inside door handle system according to the invention. Thereby, a vehicle according to the invention provides the same advantages like they are described in detail in relation to an inside door handle system according to the invention.

The vehicle or the inside door handle system according to the invention can thereby preferably comprise a control unit and/or a corresponding illumination such that preferably a common plug for the power supply of a so called I-CAN network connection or corresponding separated plugs are provided. The control unit and/or the closing system are thereby preferably parts of the vehicle and/or already part of the inside door handle system.

Likewise it is possible that the sensor element is configured by a particularly continuous wire. Hereby, a particularly cost efficient sensor element can be realized. In order to increase the function security the wire of the sensor element can be arranged in form of a double loop whereby it has to be understood that two partial sections of the wire are guided mainly parallel to one another towards a centre of deflection wherein quasi the first section is separated from the second section. This doubled relocation of the wire at an area of the support increases the measurement area of the sensor element and therewith directly the recognition area. Further, a functionality inspection of the sensor element and an inspection of a pin assignment from the sensor element become possible by a simple resistance measurement.

In order to increase a measurement effect of the sensor element an electric conducting core can be intended at the support particularly in the area of the sensor element. This electric conducting core can be quasi capacitively coupled with a sensor element and thereby increase the measurement area and/or the measurement accuracy of the sensor element. As far as the electric conducting core which is embedded at the support or in the support is located on another electric potential, than the sensor system, this electric conducting core can be used as a shielding for the sensor element. Herefore, the electric conducting core can for example be grounded or set to the zero potential. Further the electric conducting core can improve the stability of the support as far as the electric conducting core comprises metal.

With the use of a wire as a sensor element it is appropriate that the wire comprises an isolation in order to electrically isolate the wire. Ideally, the isolation can comprise PVC which improves the durability for electric isolation purposes. Further, the isolation from PVC is flexible such that the corresponding wire can be attached or adjusted to the support in any form.

Further, it is an advantage when the wire comprises multiple braids, particularly copper braids, wherein the flexibility of the wire is further increased. Moreover, with this braids also tension relief braids can be existent which further increase the tension stability of the wire.

Appropriately, the wire comprises a beginning and an end starting from the sensor element which are continuously connected by the wire itself and can establish a first section and a second section wherein in between the deflection of the wire occurs. Both ends of the wire can be assembled in a bipolar plug for the electric contacting. This plug can be directly electrically connected with the control unit. Therewith, the whole sensor element and the corresponding sensor device can be configured exclusively from the wire with the corresponding connecting plug. The isolated wire thereby protects the wire core from outer environmental influences like for example splash water, salt or such like.

Ideally, the wire of the sensor element can comprise a maximum core section of 2 mm$^2$ wherein the wire is thereby flexible enough and comprises a sufficient stability in order to be assembled at the support. Further, the electric functionality of the sensor element is correspondingly good. Particularly preferred, the wire of the sensor element can comprise a maximum cross section of smaller than 1.5 mm$^2$ and particularly preferred a maximum cross section of equal or below 0.8 mm$^2$. Thereby, it has turned out that the flexibility of the wire is improved with a decreasing cross section area. However, with a decreasing cross section area the mechanic resilience of the wire is further reduced. Further, with a decreasing cross section area the cost of the wire are reduced.

Further, it is optionally possible that the signalling element is assembled in a housing in order to protect the electric line, switches, light sources or such like particularly reliable from outer environmental influences. Thereby, the signalling element can be electrically connected via a line, particularly a data and/or energy line, with the control unit.

Therewith, it is possible that the signalling element is not directly assembled at the support but for example at an inner door panel. Further, the mounting of the signalling element at the inner door panel can be simplified since for example initially the signalling element is assembled at the inner door panel and subsequently is connected with the door handle system according to the invention via the electric line.

Further, it can be intended that the signalling element comprises at least one light source in order to be able to emit light signals. Hereby, it is possible that at least a light source can emit exactly one colour or multiple colours. Thus, for example the colour green can be chosen in order to display an actuation of the inside door handle system into the release mode. Further, corresponding symbols can be assembled at the housing of the signalling element, which are transparent for the light sources. Therewith, the intuitive actuation of the inside door handle system according to the invention can be improved by the illuminated symbol at the signalling element.

Further, it is possible according to the invention that the control unit is likewise assembled in a housing in order to be able to protect the existing electric and electronic components against outer environmental influences accordingly. Further, it is possible that the housing of the control unit is connectable with the support via retaining elements particularly reversibly connectable. Thereby, the retaining elements can be configured as clip and/or resting connections such that a toolless mounting of the control unit at the support of the inside door handle system is possible. Additionally, the support can also be configured as an acceptance for the housing of the control unit such that the control unit is particularly solid and reliably mechanically assembled with the support. Hereby, rattling noises during driving can be reliably avoided.

With the housing of the control unit it is possible that at least partially electric lines, particularly for contacts with plug contacts are injected. Therewith, the production of the corresponding control unit is simplified, since the housing takes over electric conduction functions between the plugs of the control unit and the inside of the control unit.

Appropriately, at the housing of the control unit at least two, ideally three plug sockets are assembled which are partially constructed from the housing itself. Thereby, the two or three plug sockets or a plug of the sensor element can serve for a plug of the sensor element, a plug of the signalling element and a current and data connector plug for the control unit.

Appropriately, the support itself comprises fixing elements in order to be able to assemble the support at an inner door panel and/or the door. These fixing elements can be configured as extending straps which are each equipped with a breakthrough in order to herewith fix the support at the inner door panel or directly at the door via rivets, screws or such like. Appropriately, the fixing elements extend circumferentially towards the outside of the support. Thus, a great inner free area results in which for example the actuation element for the closing system can be assembled. However, it is possible that at least some fixing elements extend into the inner area of the support in order to also achieve an assembly of the support in the inside. Further, it is possible that the support comprises no even, but a three dimensional structure with a certain height. Thereby, the fixing elements can serve for a height compensation and for the assembly of the three dimensional support at the inner door panel. For this purpose bridge-like areas with the fixing elements are intended which realize a height compensation.

Further, it should be mentioned that the present invention is only directed to an inner door panel with at least an inside door handle system according to the invention, particularly according to claim 21. Hereby, it is possible that the inside door handle system can be assembled directly or indirectly at the inner door panel, particularly via the support. For fixing the support at the inside door handle system the previously described fixing elements can be used.

BRIEF DESCRIPTION OF THE SEVERAL VIEWS OF THE DRAWINGS

Further advantages, features and details of the invention result from the subsequent description in which embodiments of the invention are described in detail with relation to the drawings. Thereby, features described in the claims and in the drawings can be essential for the invention each single by themselves or in any combination. It is shown schematically:

DESCRIPTION OF SPECIFIC EMBODIMENTS OF THE INVENTION

In the subsequent figures for the same technical features also from different embodiments and examples the identical reference signs are used.

Figure 1:
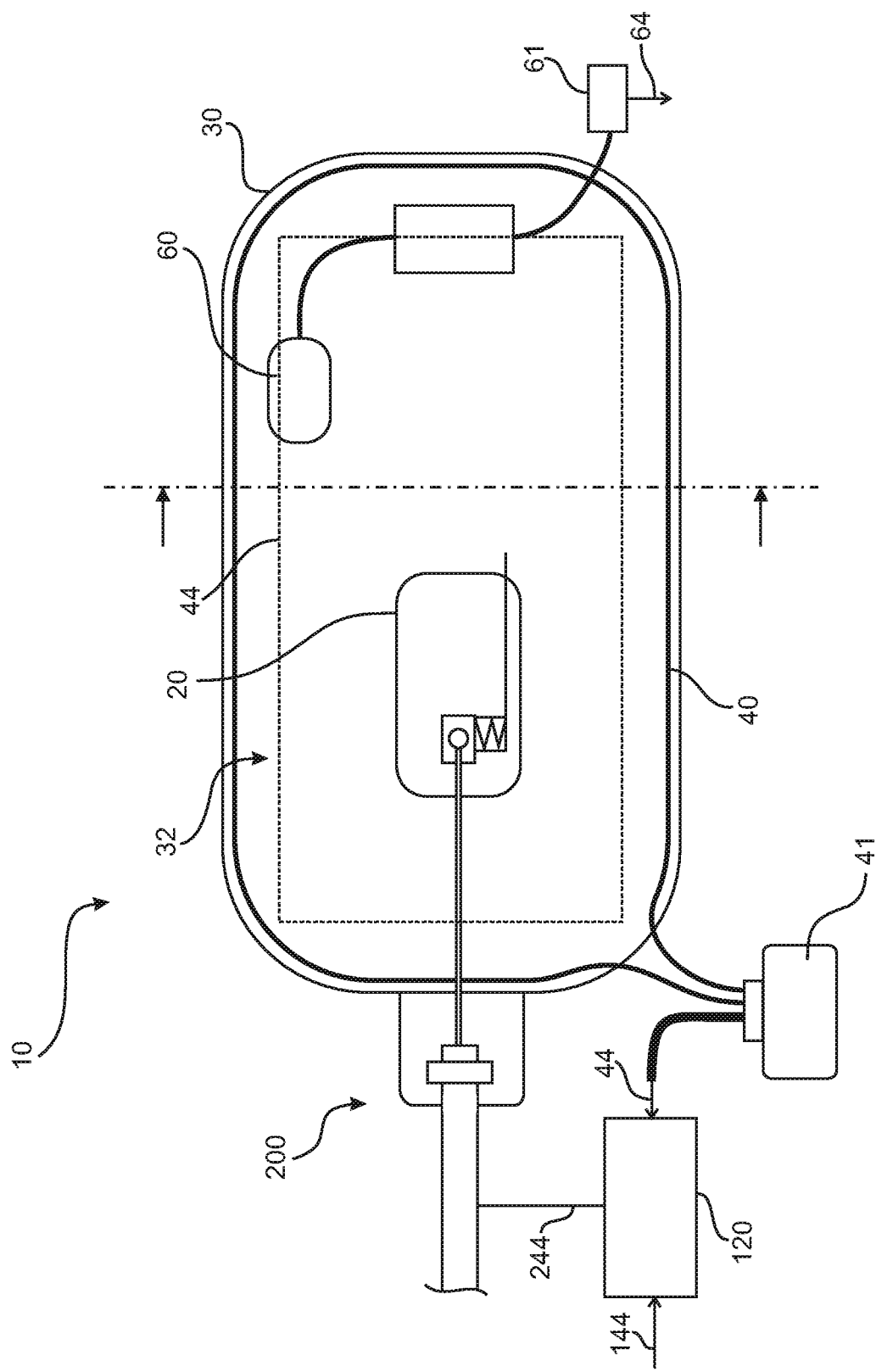
FIG. 1 a first embodiment of an inside door handle system according to the invention, FIG. 2 a further embodiment of an inside door handle system according to the invention, FIG. 3*a* a further embodiment of an inside door handle system according to the invention, FIG. 3*b* a further embodiment of an inside door handle system according to the invention, FIG. 3*c* a cross section through a wire of the sensor element, FIG. 4 an embodiment of a vehicle according to the invention, FIG. 5 a topview of a further embodiment of an inside door handle system according to the invention, wherein a control unit is assembled at the support, FIG. 6 a three dimensional view of the rear side of the embodiment of the door handle system according to the invention from FIG. 5, FIG. 7 a corresponding topview of the embodiment of the inside door handle system according to the invention from FIG. 5, however without control unit, signalling element and sensor element, FIG. 8 a detailed enlargement in the area of the acceptance at the support for the control unit from the embodiments from FIG. 5 and 6, FIG. 9 a further detailed view to an arrangement of the sensor element in form of a wire according to the embodiments from FIG. 5 and 6, FIG. 10 a three dimensional view of a part of the housing of the control unit with injected lines, FIG. 11 a three dimensional view of a signalling element from FIG. 5 and 6 with at least two illuminatable symbols, FIG. 12 a three dimensional view of a preformed sensor element in form of a wire for the embodiment from FIGS. 5 and 6 and FIG. 13 a topview on the area of the inner door panel from the user view with a part of the inside door handle system according to the invention.

FIG. 1 schematically shows how an inside door handle system 10 according to the invention can be configured. A support 30 is configured with a recess like it is subsequently described in relation to FIGS. 3a and 3b. Within the recess an actuation element 20 is assembled which can configure a rotationally moveable and therewith rotationally mounted actuation system 20 and an electric sensor function like subsequently described.

In case a user of the inside door handle system 10 desires to open the door he will approach the inside door handle system 10 with an object in form of his hand. The approaching, particularly in direction of the actuation element 20, will be recognized by a circumferential wire which the sensor element 40 provides by entering the corresponding recognition area 42. Thereby, the recognition signal 44 is transmitted to a control unit 120. As soon as the object reaches the actual actuating element 20 it is additionally recognized and transmitted in form of a contact signal 64 from a further sensor element 60 and the corresponding sensor device 61. The signals like the contact signal 64 for an electromechanic open situation and the recognition signal of the sensor device 41 are combined with a release signal 144 on the vehicle side of the vehicle 100 in the control unit 120 such that only with the correlation with, for example, a stationary vehicle according to other situations like the unfastened passenger or an occupance information to the neighbouring seat the actual release and therewith the control signal 244 is transmitted to the closing system 200. The closing system 200 is therewith moved or positioned in the release mode such that now in the unlocked state and not in the locking state the opening movement of the whole locking system 200 can occur via the actuation element 20.

Figure 2:
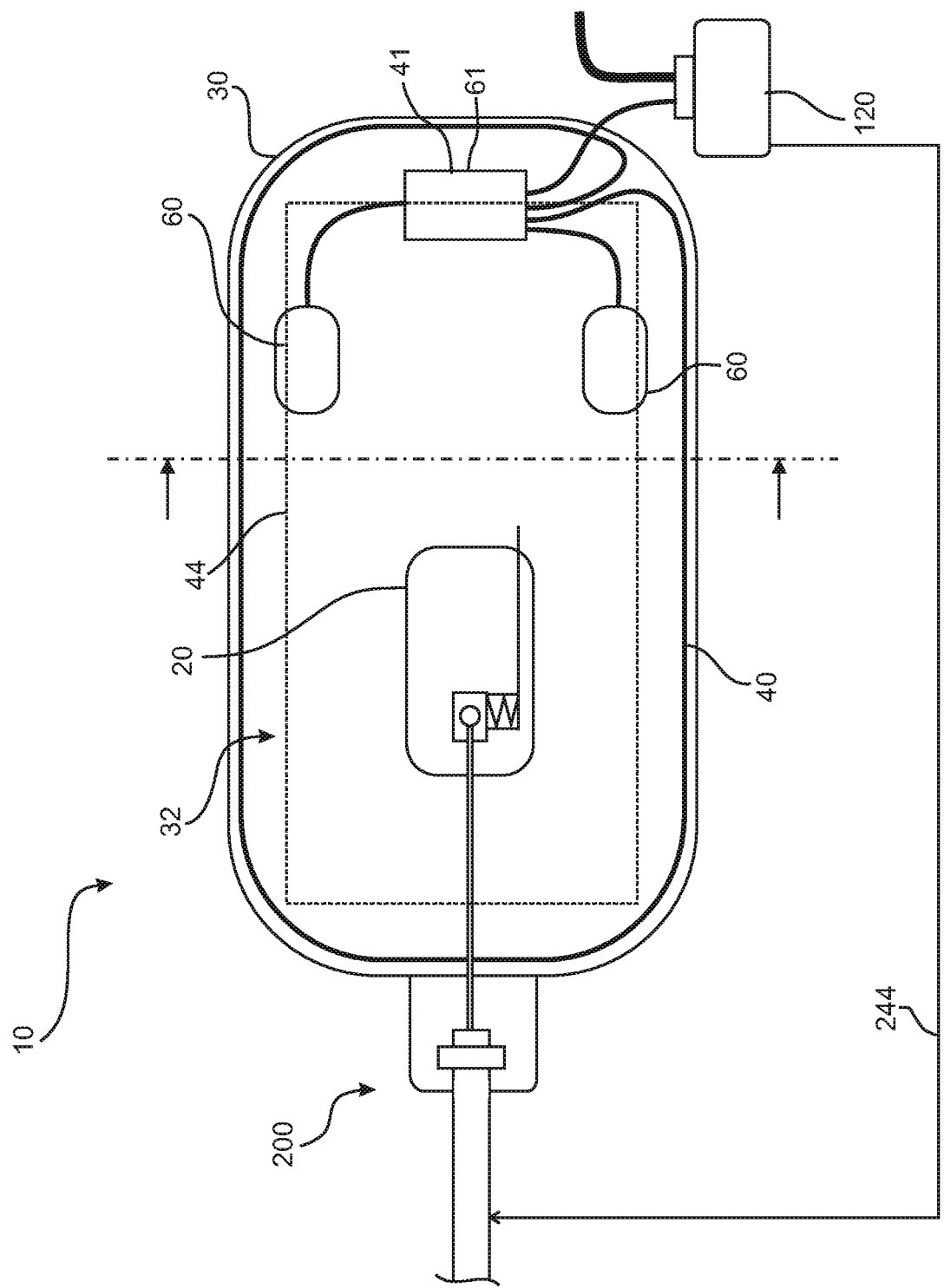

FIG. 2 shows a correlation with which two separate further sensor elements 60 are intended wherein otherwise the correlation according to FIG. 1 was maintained. The extension of the sensor function by further sensor elements 60 leads to a further increase of the overall functionality and therewith the security and comfort.

FIG. 3a shows a technical implementation with which on the rear side of the support 30 in a corresponding recess a wire is laid for the sensor element 40. In the perpendicular projection area the recognition area 42 is configured such that the actuation element 20 is intended within the recognition area 42 in an engaging manner. At the same time a signalling element 50 is intended as an optic signalling element 50 in order to display the release mode or a locked release mode of the closing system in an optical manner. Further, with this embodiment a fastening element 48 is intended which in a hook-like engaging manner provides the exact fastening and moreover the defined positioning of the sensor element 40.

Likewise optionally in FIG. 3a an electric conducting core 30.1 is shown in the support 30 which can capacitively interact with the sensor element 40, particularly in form of a wire 40.1. Thereby, the electric conducting core 30.1 can serve as a shielding or reinforcing element for a capacitive sensor element 40. Accordingly, the electrically conducting core 30.1 is assembled in the area of the respective sensor element 40. The shown configuration in FIG. 3a of the support 30 with the electrically conducting core 30.1 according to the invention is only an optional improvement of the invention. Further, the wire 40.1 can be intended as a double loop like it can be recognized in FIG. 5.

FIG. 3b is based on the embodiment of FIG. 3a, wherein here in an integrally embedded manner the sensor element 40 is part of the material of the support 30. This can for example be provided by a corresponding injection moulding method.

In FIG. 3c a cross section through the sensor element 40 in form of a wire 40.1 is shown. Hereby, it can be recognized that the wire 40.1 comprises single braids 40.5 which can be twisted with one another. By the use of braids 40.5 the flexibility of this wire 40.1 is increased wherein the mounting of the sensor element 40 at the support 30 is particularly simplified. Therewith, also a deflection 40.8 between the first section 40.2 and the second section 40.3 of the wire 40.1 is particularly simple. A maximum cross section 40.6 of the wire 40.1 is likewise shown in FIG. 3c. In order to protect the wire 40.1 and therewith the sensor element 40 particularly from environmental influences from the outside an isolation 40.4 is intended which completely embraces the wire 40.1. Only in the area of a plug 40.7 the braids 40.5 of the wire 40.1 are connected electrically conducting without isolation 40.4 with the plug contacts of the plug 40.7. Appropriately, the plug 40.7 configures a watertight connection with a complementary configured plug socket 120.2 of the control unit 120.

Figure 4:
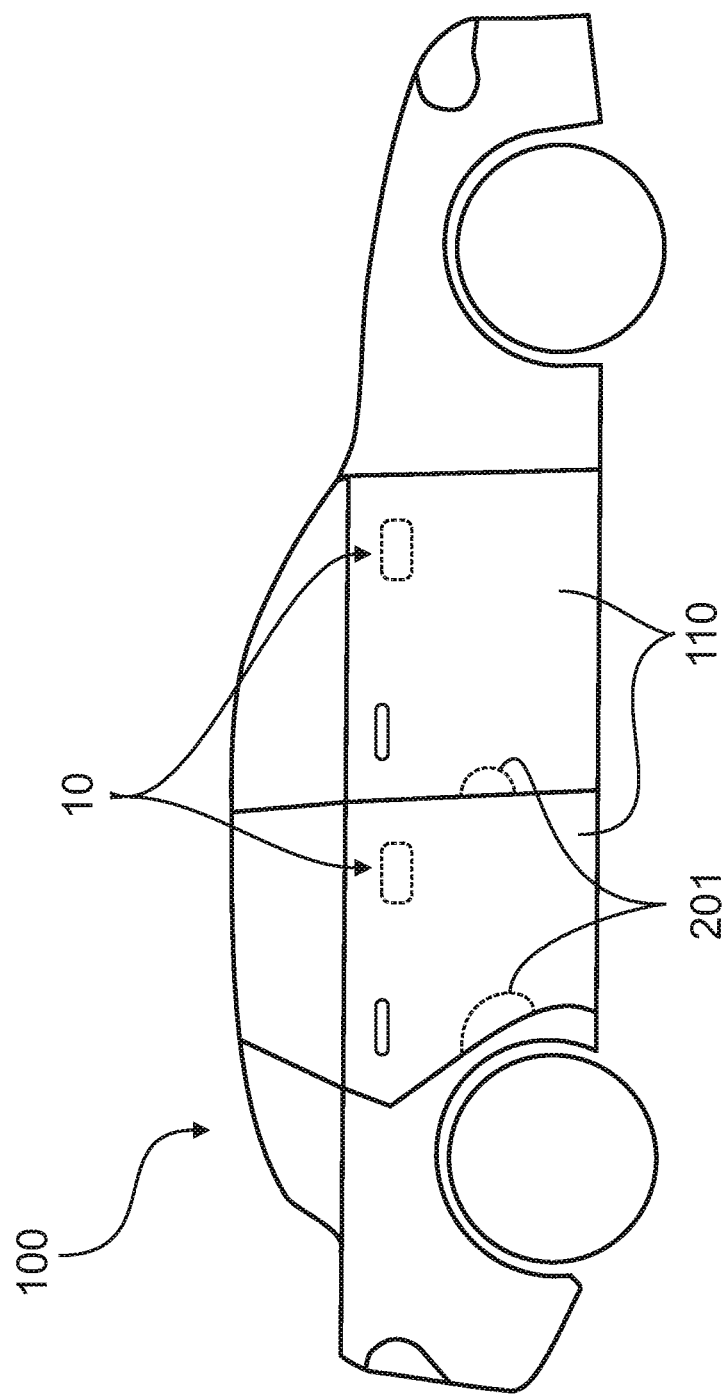

In FIG. 4 a vehicle 100 with doors 110 is shown, which each configure or comprise an inside door handle system 10 according to the invention. This means that the functionality according to the invention can be provided for each single door 110 in a separate and specific manner by the separate and specific inside door handle system 10. At the outer doors 110 external door handles of the vehicle 100 are shown and dashed the inside door handle system 10 in the inside of the vehicle. This inside door handle systems 10 according to the invention act with likewise dashed locks 201 in order to be able to open and close the doors 110 at the vehicle 100.

Figure 5:
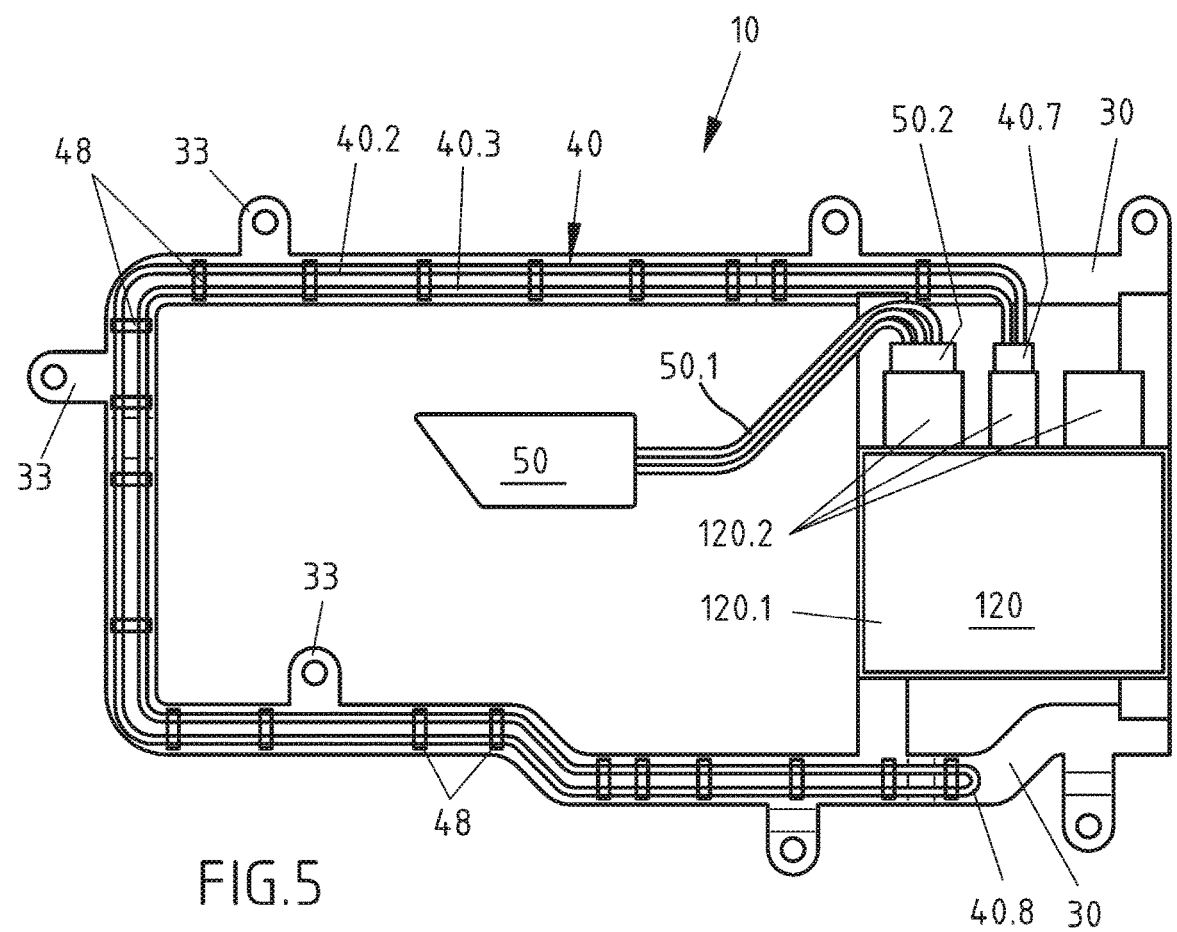

In FIG. 5 a further topview on another embodiment of the inside door handle system according to the invention is shown. Thereby, the sensor element 40 is configured as a double loop in form of a wire 40.1, which configures a first section 40.2 and a second section 40.3, which are conceptionally separated from one another by the deflection 40.8 (not electronically or mechanically). Both ends of the wire 40.1 are connected electrically conducted with the plug 40.7 and are brought in plug connection with the control unit 120. Herefore, the controlling unit 120 comprises a housing 120.1 at which plug sockets 120.2 for the plugs 40.7, 50.2 or such like are intended. The sensor element 40 in form of a wire 40.1 is assembled via the fastening element 48 at the support 30 in a form and/or force fitting manner, wherein a detailed view can be recognized in FIG. 9. Likewise the fastening of the control unit 120 in the recess 34 of the support 30 is shown in detail in FIG. 8. Further, with the embodiments from FIG. 5 a signalling element 50 is electrically conducting connected via a plug 50.2 using lines 50.1. In FIG. 11 a complete signalling element 50 is shown.

Figure 7:
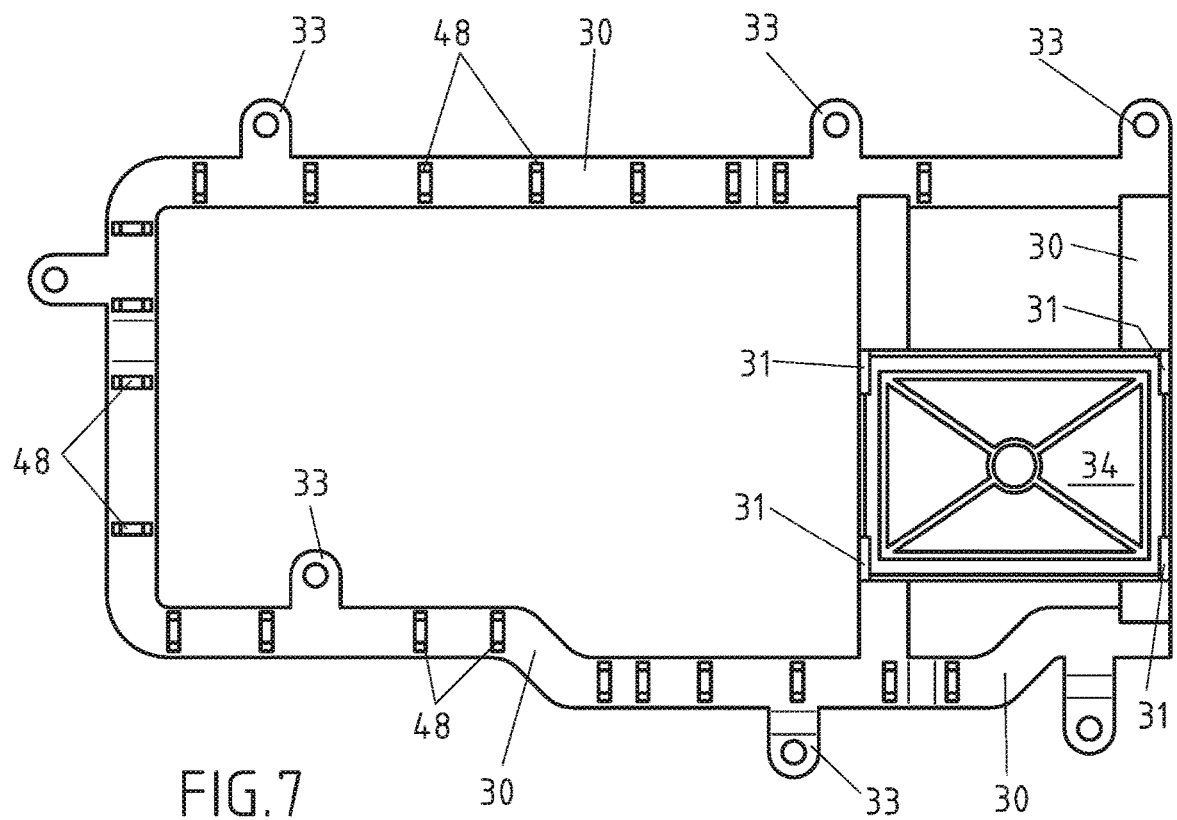

In order to better recognize the support 30 this is shown in FIG. 7 without further elements, namely the control unit 120, the sensor element 40 and the signalling element 50. Hereby, the clip-like fastening elements 48 are visible on the support 30, which fix or hold the sensor element 40 at the extent of the support 30. For the fastening of the support 30 fixing elements 33 are further intended, which laterally extend flap-like from the support 30. Thereby, most of the fixing elements 33 extend towards the outside in order to therewith keep the inner free space particularly for the actuation element 20. However, it is possible that some fixing elements extend towards the inside, for example, the fixing element 33 at the lower left at the support 30. Likewise the acceptance 34 of the support 30 for the control unit 120 can be recognized in FIG. 7, wherein additional retaining elements 31 are intended, which particularly serve for the toolless attachment of the control unit 120, particularly by the housing 120.1 at the support 30. Support 30, acceptance 34 and retaining elements 31 can be produced by a plastic injection moulding part.

Like it can be recognized in FIG. 6 the support 30 does not configure a plane but a three dimensional construct, which contains a height profile. By the three dimensional configuration the support 30 can be adjusted at the inner side of the door handle panel 111 or the door 110 optimally to the existing form. Herefore, the already described fixing elements 33 serve for the assembly. Like it can be recognized by the fixing elements 33 in the lower left these extend partially bridge-like and therewith overcome a height from the remaining support 30, whereby a flexible fastening of the support 30 at the door 110 or the inner door panel 111 is possible. In FIG. 6 the support 30 according to the invention is shown from its rear side, namely the opposing side from FIG. 5. In this view the control unit 120 is covered more or less completely by a support 30, particularly the acceptance 34. It can be clearly recognized with the signalling element 50 that this comprises at least one light source 50.3, wherein in the present example two light sources 50.3 are existent. These two light sources 50.3 can each emit monochrome light or light of different light colours. In order to assemble the signalling element 50 flexibly at the inner door panel 111 or the door 110 the signalling element 50 is connected via a line 50.1 with the control unit 120. Since in the present embodiment of the inside door handle system 10 the sensor element 40 is assembled at the front side of the support 30, meaning the visible side of FIG. 5, the sensor element 40 cannot be recognized also from the rear side from FIG. 6. Only the single fastening elements 48 on the rear side of the support 30 are indicated. Likewise optionally and dashed in the support 30 an electrically conducting core 30.1 is indicated, which can be embedded or injected at the support 30.

Figure 8:
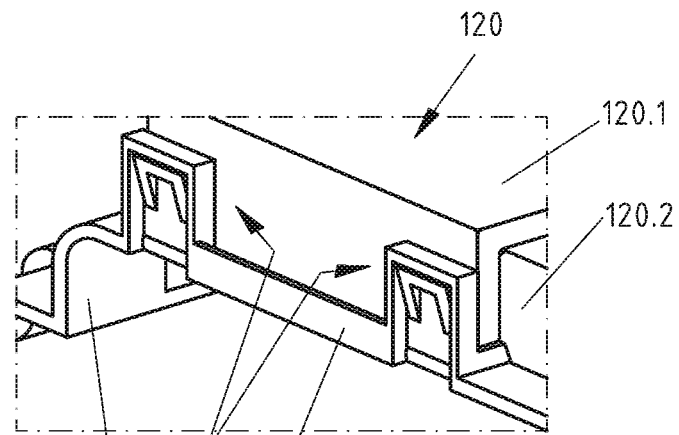

In FIG. 8 a detailed view for the fastening of the control unit 120 is shown at the support 30. Hereby, the single retaining elements 31 are visible, which extend from a clip and/or latching connection between the housing 120.1 of the control unit 120 and the U-like extending brackets at the support element 30, particularly configured in the area of the acceptance 34. A toolless mounting of the control unit 120 thereby occurs only by a pressing of the control unit 120 with the housing 120.1 on the support 30 in the area of the acceptance 34. Thereby, automatically the wedge-shaped extensions at the housing 110.1 of the retaining elements 31 latch behind the U-like brackets of the support 30 which configure the counter retaining elements 31. Hereby, a form and/or force fitting fastening of the control unit 120 is realized at the support 30.

Figure 9:
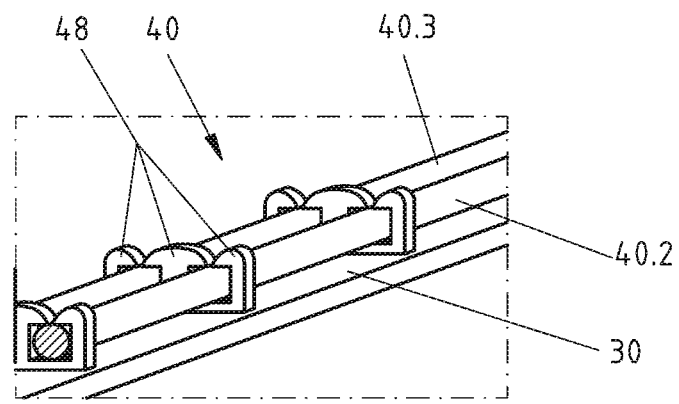

Likewise the sensor element 40 can be easily attached in a similar manner at the support 30 such that a wire 40.1 of the sensor element 40 has to be pushed from above, meaning perpendicularly to the single fastening elements 48, see FIG. 9. Thereby, the wire latches with its respective first section 40.2 or second section 40.3 at least form fittingly at the support 30. Like it can be recognized in FIG. 9 the central clip element of the fastening element 48 is configured T-like and extends with its head from the support 30. Left and right side from the T-like configured clip element two (upside down) L-like configured clip elements are existing, wherein the short ends of the L's are adjusted to the central T-like clip elements, respectively, in order to therewith configure an acceptance for the respective section of the wire 40.1. In order to simplify the fastening of the single sections 40.2, 40.3 of the wire 40.1 at the support slanted entrees or lead-in curves are intended at the upper side of the clip elements in which the wire 40.1 can slide along during the pressing-in.

Figure 10:
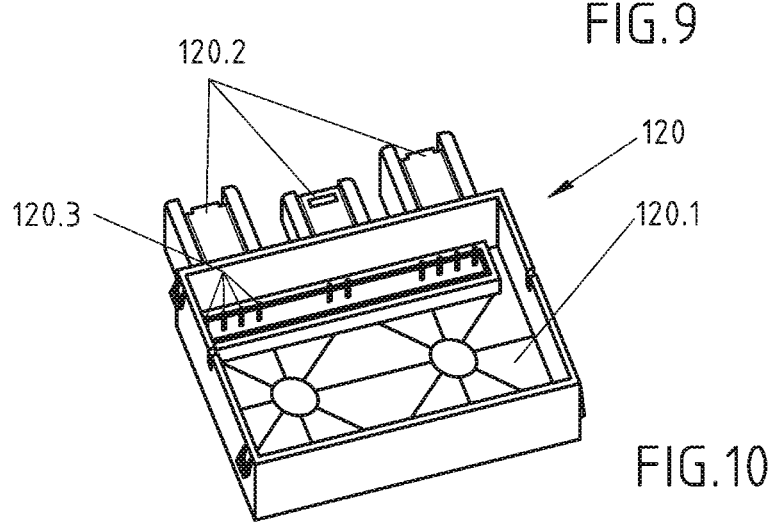

In FIG. 10 a part of the housing 120.1 of the control unit 120 is shown. Hereby, it can be recognized that the part of the lines 120.3 is injected into the housing in order to particularly electrically conducting connect the plug sockets 120.2 with the inner electronic or electric in the housing 120.1. By this assembly of the electric line 120.3 a particularly water tight and comfortable configuration of the control unit 120 can be realized, which can be produced cost efficiently and very reliably. A circuit board can be solded to the open end of the line 120.3 for this purpose, wherein an electric contacting of the whole controlling 120 with the control sockets 120.2 is producible.

In the further FIG. 11 the signalling element 50 is shown with its housing 50.4 of the line 50.1 and the plug 50.2, wherein the signalling element 50 is electrically connectable with the control unit 120. In the housing 50.4 one or multiple light sources 50.3 can be intended in order to, for example, illuminate both optionally shown symbols 50.5 from the inside. By the use of the corresponding light source 50.3 a colour selection of the emitted light can occur. Thus, for example the warning triangle 50.5 can be illuminated in red, wherein the opening symbol 50.5 for opening a door can be shown in green. Ideally, the whole electronic is solidly embedded in the housing 50.4, wherein this, for example, can be injected with a casting compound.

In FIG. 12 the complete sensor element 40 or the sensor device 41, which in the present case is sufficient without further electronic, is shown. Thereby, the sensor element 40 comprises mainly a wire 40.1, which is used as a double loop. Like it can be recognized, the form of the wire 40.1 at the three dimensionally configured support 30 is preformed, particularly from FIG. 6. The single sections 40.1 and 40.3 are conceptionally separated by the deflection 40.8. This preformed wire 40.1 only needs to be pushed to the support 30, particularly the fastening elements 48 in order to therewith produce a form fitting and/or force fitting connection with the support 30. The electric contact with the controlling unit 120 can occur via the plug 40.7.

In FIG. 13 a topview on the inner door panel 111 is shown from the view of the passenger compartment of the vehicle 100. This view results with the actuation of the inside door handle system 10 according to the invention. Like it can be recognized, at the outside only the actuation element 20 and the support recess 32 and the signalling element 50 with two symbols can be recognized. At the same time the inside door handle system 10 according to the invention can also be connected to a speaker 121 in order to also emit a warning tone and not only an optic warning signal via the signalling element 50 for the user. Further, the speaker 121 can be connected with a radio vehicle system and/or stereo system. The assembly of the inside door handle system 10 according to the invention occurs from the rear side of the inside panel 111, which naturally is not visible from the outside. Herefore serve the already described fixing elements 33.

The previous description of the embodiment describes the present invention only within the scope of examples. Thereby naturally, features of the single embodiments, as far as technically meaningful, can be freely combined with one another without leaving the scope of the present invention.

REFERENCE LIST

10 Inside door handle system
20 Actuation element
30 Support
30.1 Electronically conductive core
31 Retaining element, particularly for 120

32 Support recess
33 Fixing element, particularly for 111
34 Acceptance for 120
40 Sensor element
40.1 Wire of 40
40.2 First section of 40.1
40.3 Second section of 40.1
40.4 Isolation
40.5 Braids
40.6 Cross section
40.7 Plug for 120
40.8 Deflection
41 Sensor device
42 Recognition area
44 Recognition signal
48 Fastening element
50 Signalling element
50.1 Line
50.2 Plug for 120
50.3 Light source
50.4 Housing
50.5 Symbol, particularly luminous
60 Sensor element
61 Sensor device
64 Contact signal
100 Vehicle
110 Door
111 Inner door panel
120 Control unit
120.1 Housing
120.2 Plug socket for 120
120.3 Line
121 Speaker
144 Release signal
200 Closing system
201 Mechanical or electro mechanical lock
244 Control signal

The invention claimed is:

1. An inside door handle system for a door of a vehicle, wherein the door is transferable into a locking state and into an unlocked state by a closing system, comprising:
   an actuation element for the actuation of the closing system and at least one support connectable with the door at which the actuation element is assembled; and
   at least a sensor element which with an approaching of an object inside the vehicle in its recognition area transmits a recognition signal;
   an inner door panel;
   wherein a release mode for the closing system is provided with which the closing system is in the unlocked state with which the actuation of the actuation element successively effects an opening function of the door wherein a control unit can be brought into data communication with the closing system and the sensor element,
      wherein in dependence on an existing recognition signal and of a vehicle related release signal the control unit transfers the closing system into the release mode,
      wherein the actuation element is arranged within the recognition area of the sensor element,
      wherein the support comprises a corresponding support recess in which a user can reach in order to reach the actuation element, and
      wherein the sensor element is configured by a continuous wire which is arranged as a double loop at least partially circumferentially at the support around the recess to create a measurement area of the sensor element and to facilitate the detecting of the user reaching into the recess;
   wherein the support is assembled directly or indirectly at the inner door panel.

2. The inside door handle system according to claim 1, wherein the actuation element is arranged within the projection area of the sensor element.

3. The inside door handle system according to claim 1, wherein a double relocation of the double loop increases at least one of the measurement area in relation to a single loop and therewith increases directly the recognition area of the sensor element and an electric functionality of the sensor element.

4. The inside door handle system according to claim 1, wherein the sensor element comprises at least one conducting path, which is assembled circumferentially.

5. The inside door handle system according to claim 1, at least wherein the wire is electrically isolated from the sensor element by an isolation or wherein the wire from the sensor element comprises multiple braids.

6. The inside door handle system according to claim 1, wherein the wire of the sensor element comprises a maximum cross section of 2.00 mm2, preferably a maximum cross section of 1.50 mm2 and preferred a maximum cross section of 0.8 mm2.

7. The inside door handle system according to claim 1, wherein the sensor element is arranged as an electrically conducting coating.

8. The inside door handle system according to claim 1, at least wherein the sensor element is assembled at the support via at least a fastening element or wherein the sensor element is at least partially embedded into the support.

9. The inside door handle system according to claim 8, wherein the at least one fastening element for the sensor element is configured as a clip element.

10. The inside door handle system according to claim 8, wherein the at least one fastening element is configured hook-like and at least partially embraces the sensor element.

11. The inside door handle system according to claim 1, wherein at least a signalling element is intended in order to signal at least partially a mode of the closing system.

12. The inside door handle system according to claim 1, wherein the control unit is assembled in a housing, wherein the housing is connectable via retaining elements with the support.

13. The inside door handle system according to claim 12, wherein in the housing of the control unit at least partially electric lines are injected.

14. The inside door handle system according to claim 1, wherein at the support fixing elements are assembled, with which the support is arrangable at the inner door panel.

15. The inside door handle system according to claim 1, wherein at or in the support an electrically conducting core is intended.

16. The inside door handle system according to claim 1, wherein a further sensor element recognizes at least a contact of the actuation element and generates a contact signal, wherein an actuation of the closing system can occur in case at the same time the vehicle related release signal exists at the control unit.

17. The inside door handle system according to claim 1, wherein the actuation element is arranged moveably via a bearing at the support and the movement of the actuation element serves for the actuation in order to open the door.

18. A vehicle, with at least an inside door handle system comprising the features according to claim 1.

19. The inside door handle system according to claim 2, wherein the projection area is configured by an essentially perpendicular projection from the direction of the actuation element to the sensor element.

20. The inside door handle system according to claim 9, wherein a clip element is configured in a way to fix two wire sections, simultaneously.

21. An inside door handle system for a door of a vehicle, wherein the door is transferable into a locking state and into an unlocked state by a closing system, comprising:
an inner door panel;
an actuation element for the actuation of the closing system and at least one support connectable with the door at which the actuation element is assembled; and
at least a sensor element which with an approaching of an object inside the vehicle in its recognition area transmits a recognition signal,
wherein a release mode for the closing system is provided with which the closing system is in the unlocked state with which the actuation of the actuation element successively effects an opening function of the door wherein a control unit can be brought into data communication with the closing system and the sensor element,
wherein in dependence on an existing recognition signal and of a vehicle related release signal the control unit transfers the closing system into the release mode,
wherein the support comprises a corresponding support recess in which a user can reach in order to reach the actuation element, and
wherein the actuation element is arranged within the recognition area of the sensor element, wherein the sensor element comprises at least one conducting path which is arranged circumferentially around the recess at the support to provide a capacitive recognition for the sensor function and to facilitate the detecting of the user reaching into the recess;
wherein the support is assembled directly or indirectly at the inner door panel.

22. The inside door handle system according to claim 1, wherein the sensor element is mounted on the inner door panel.

23. A vehicle, with at least an inside door handle system comprising the features according to claim 21.

* * * * *